No. 884,766.

PATENTED APR. 14, 1908.

A. & G. A. SCHWEHR.

FRICTION CLUTCH.

APPLICATION FILED NOV. 4, 1907.

WITNESSES:
Arthur S. Remsberg.
Nathan F. Fretter.

INVENTORS
Albert Schwehr and
George A. Schwehr
BY Bates, Fouts & Hull
ATTYS.

UNITED STATES PATENT OFFICE.

ALBERT SCHWEHR AND GEORGE A. SCHWEHR, OF SANDUSKY, OHIO.

FRICTION-CLUTCH.

No. 884,766.      Specification of Letters Patent.      Patented April 14, 1908.

Application filed November 4, 1907. Serial No. 400,659.

*To all whom it may concern:*

Be it known that we, ALBERT SCHWEHR and GEORGE A. SCHWEHR, citizens of the United States, residing at Sandusky, in the county of Erie and State of Ohio, have invented a certain new and useful Improvement in Friction-Clutches, of which the following is a full, clear, and exact description, reference being had to the accompanying drawing.

Our invention relates to friction clutches, and it has for its object the production of a device of this character that is simple and compact in its construction, that is efficient in operation, that is convenient of attachment, and that is easy of control.

While our clutch is especially adapted for use on gas engines, in which case it may be applied directly to the end of the engine shaft, it is not limited to such use, as will hereinafter be made to appear.

Figure 1:
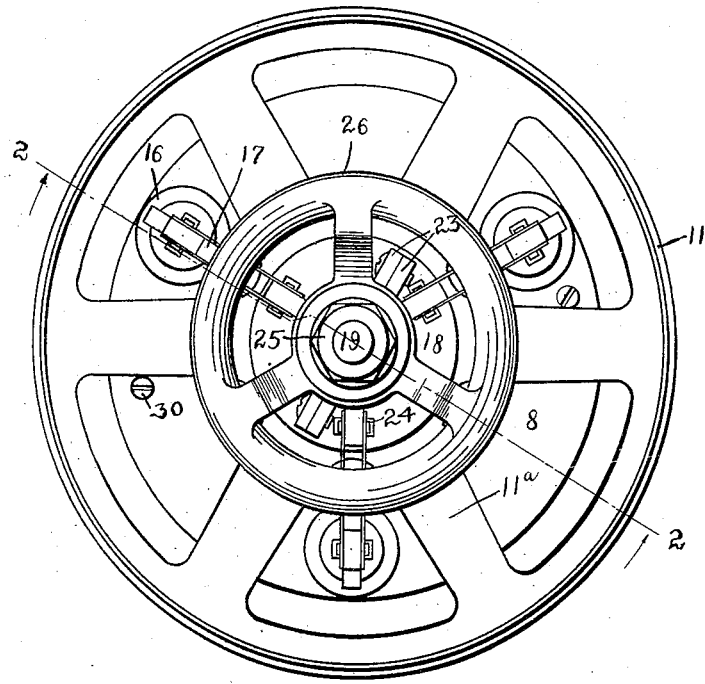
Figure 2:
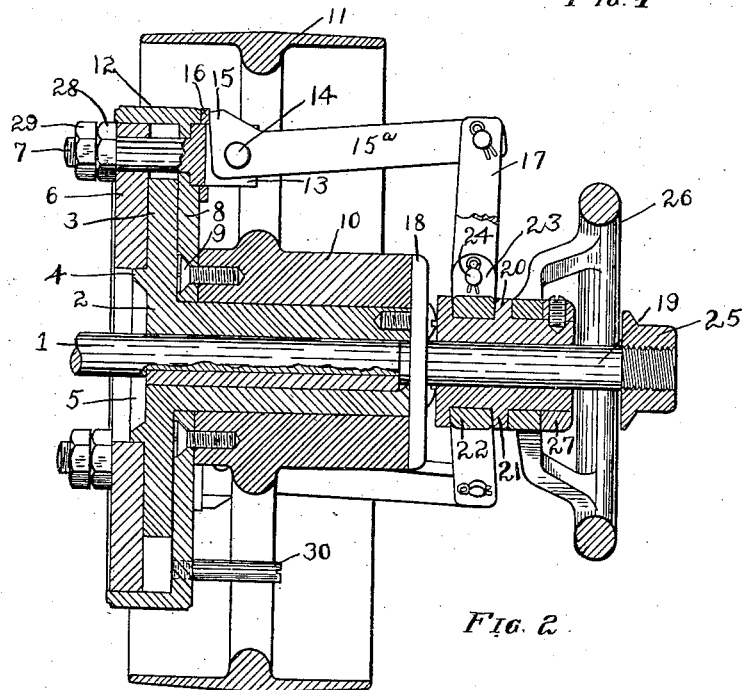

In the drawings forming a part of this application, Figure 1 is a side elevation of a pulley wheel having our improved clutch applied thereto and Fig. 2 is a central longitudinal section through Fig. 1, the same being taken substantially on the line 2—2 of that figure.

While the drawings show our invention as applied to a pulley, it will be understood that a pulley is selected merely for the purpose of illustrating a member which is driven by our clutch, and any other form of member, such, for example, as a gear wheel or a fly wheel, may be employed instead.

Referring to the drawings for a fuller description, in which drawings similar reference characters designate corresponding parts throughout the several views, 1 represents the end of a shaft, which may be the end of the shaft of an explosive engine. To this shaft is keyed or otherwise secured the driving member 2 of the clutch, said member having an elongated sleeve extending in the direction of the shaft, on the inner end of which sleeve there is provided a disk extension 3, the opposite faces of which are preferably parallel with each other. On the inner face of this disk extension we place an annular bead or ledge 4, the inner surface of which is beveled as shown in Fig. 2 so as to form a socket 5. When the clutch is used on the end of the shaft of an explosive engine the member 2 is caused to bear closely against the hub of the fly wheel of the engine, said hub extending into the socket 5, thereby securing compactness of construction.

Encircling the bead or ledge 4, and bearing against the inner face of the disk extension 3, is a friction ring 6, said ring being secured, by means of bolts 7, to the driven member 8 and forming, in effect, a part thereof. The latter member is loosely journaled upon the extended sleeve of the member 2 and is secured, by countersunk screws 9, to the hub 10 of pulley 11. The inner face of said member 8 is adapted to frictionally engage with the outer face of the driving member 3, and at its outer rim it is provided with an annular flange 12 which extends over the outer periphery of the ring 6, so that said ring is contained within said flange and between the latter and the bead or ledge 4 of the disk extension 3. The bolts 7 are provided on their outer ends with bifurcated heads 13, between the bifurcations of which we pivot the inner ends of bell crank levers 14. The short arms 15 of these levers are adapted to bear against rings 16 that are loosely mounted upon the heads 13 of the bolts 7, said rings finding their inner bearings against the member 8 opposite the annular flange 12. The longer arms 15ª of the levers 14 extend beyond the pulley 11 where they may be joined to links 17 through which said levers may be rocked.

Secured to the member 2, so as to turn with the shaft 1, is a disk 18, at the center of which we provide a stub shaft extension 19, said extension being in line with the shaft 1. Loosely mounted upon the shaft extension is a shifting collar or member 20, said collar being provided with an annular groove 21 within which operates the ring or band 22. As is shown in Fig. 1, this ring or band is formed in halves, the parts thereof being held together by having outwardly extending portions which are secured together. In assembling, these two parts would be separate and would be placed within the annular groove 21, after which the parts would be secured together as stated. Projecting from the ring 22 are lugs 23, there being one of said lugs for each of the levers 14, or for each of the sets of links 17. These links are secured to the levers and to the said lugs by means of pins 24, the links passing upon opposite sides of the levers and of the lugs. As shown in the drawings, three sets of links, lugs and levers are provided, although this number may be changed if desired. In Fig. 2 the shifting collar or member 20 is shown in its innermost position, in which position the links extend almost at right angles as well as radially from said collar. When the collar is in its outer position its outer end bears against a nut 25 on the end of the shaft extension 19. When in this latter position, the links 17 will incline to a considerable degree from a right-angle position with the result that the outer ends of the levers 14 are drawn toward each other, and the shorter arms 15 are moved away from the rings 16. Toward its outer end the shifting collar 20 is turned down to a smaller diameter, so as to provide a bearing for a hand wheel 26, said wheel being loosely mounted on the shifting collar and being held in place thereon by a collar or washer 27 that is secured to the said collar 20.

The inner ends of the bolts 7 are screw threaded for the reception of nuts 28, which nuts may be held from loosening by jam nuts 29 on the said bolts. By means of these nuts the members 6 and 8 may be adjusted relatively to each other.

From this description it will be understood that the disk extension 3 rotates with the drive shaft, while the members 6 and 8 are normally stationary, the driving member turning therebetween. Under these conditions the shifting collar 20 and the hand wheel 26 occupy their extreme outward positions. When it is desired to drive the pulley or other member 11, the hand wheel is forced inwardly carrying with it the shifting collar 20. This movement results in forcing outwardly, by means of the links 17, the outer ends of the levers 14, said levers and links forming toggle joints. This inward movement of the collar 20 is continued until its inner end contacts with the disk 18, or with the screws that secure said disk to the member 2, which movement is sufficient to carry the links past the position in which they will extend at right angles from the shaft, so that the tendency of the collar 20 is to continue its inward movement. By this means, therefore, the clutch is maintained in operative condition until it is thrown out of such condition by pulling outwardly upon the hand wheel. As the outer ends of the levers 14 are thrown upwardly their shorter ends, bearing against the rings 16, pull upon the bolts 7 and thereby draw the members 6 and 8 into close frictional engagement with the disk member 3. When this takes place the rotation of said disk member is transmitted through the members 6 and 8 to the pulley, so that the latter is also driven with the shaft. By adjusting the nuts 28 and 29 on the bolts 7 the amount of friction between the driving and driven members of the clutch is regulated.

It will be understood that if the short arms 15 of the levers 14 were caused to bear directly against the member 8 they would eventually wear said member until the adjustment of the clutch would be destroyed, or until the clutch is rendered useless. For this reason we provide the rings 16 against which the shorter arms 15 bear, said rings being loosely mounted as stated, so that they will turn about the bolt heads 13 and thereby present fresh surfaces against which the arms 15 may act.

While we have shown a hand wheel 26 for operating the shifting collar 20, and while in some instances we prefer to use such a wheel, we desire it to be understood that other means may be adopted for shifting said sleeve.

While in the above description we have assumed that the shaft 1 and the pulley 11 are the driving and driven members, respectively, it will be understood that power may be applied to the pulley and transmitted to the shaft through the friction clutch.

In order to relieve the screws 9 from bearing all of the driving strain, we provide one or more drivers 30 projecting from disk 8 and adapted to be engaged by spokes 11ª of pulley 11. These drivers are shown as studs threaded into the disk 8, but it will be evident that they may be cast therewith if desired.

Having described our invention, we claim:

1. In a friction clutch, a drive shaft, a driving clutch member secured to said shaft, said member having a sleeve and a disk extension, a ledge on one face of said disk extension, a driven clutch member journaled upon the sleeve of the driving clutch member, said driven member having a flange that is adapted to fit one face of the driving clutch member, a friction ring surrounding the said ledge and fitting the other face of said extension, bolts connecting said ring with the disk of the driven clutch member, nuts on said bolts for adjusting the ring and the disk of the driven member with respect to each other, said bolts having bifurcated heads, rings surrounding said heads and engaging with the said disk extension of the driven member, bell crank levers pivoted in said bifurcated heads, the shorter arms of said levers being adapted to engage with the said rings, a shifting collar, links connecting said shifting collar with the longer arms of said bell cranks, and means for shifting said collar, whereby, when the collar is moved in one direction, said links will cause said bell cranks to rock and the shorter arms of said bell cranks to bear against said rings and thereby exert a pull upon the said bolts for drawing the friction ring and the disk of the driven clutch member into frictional engagement with the disk of the driving clutch member.

2. In a friction clutch, a drive shaft, a driving clutch member secured to said shaft, said member having a sleeve and a disk extension, a ledge on one face of said disk extension, a driven clutch member journaled upon the sleeve of the driving clutch member, said driven member having a disk that is adapted to fit one face of the driving clutch member, a friction ring surrounding the said ledge and fitting the other face of the said disk extension, bolts connecting said ring with the disk of the driven clutch member, nuts on said bolts for adjusting the ring and the disk of the driven member with respect to each other, said bolts having bifurcated heads, rings surrounding said heads and engaging with the said disk extension of the driven member, bell crank levers pivoted in said bifurcated heads, the shorter arms of said levers being adapted to engage with the said rings, a stub shaft in axial alinement with the drive shaft, a shifting collar on said stub shaft, links connecting said shifting collar with the longer arms of said bell cranks, and means for shifting said collar, whereby, when the collar is moved in one direction, said links will cause said bell cranks to rock and the shorter arms of said bell cranks will bear against said rings and thereby exert a pull upon the said bolts for drawing the friction ring and the disk of the driven clutch member into frictional engagement with the disk of the driving clutch member.

3. In a friction clutch, the combination of a clutch member having a sleeve and a disk extension, a second clutch member having a disk and a cylindrical flange at the end of the disk, said second clutch member having also a loose ring engaging the inner periphery of said flange, bolts passing through the two parts of the second clutch member and surrounded by said flange, bell crank levers for operating said bolts, and a pulley connected with the second clutch member, said levers extending through said pulley.

4. In a friction clutch, the combination of a clutch member having a disk, a second clutch member having two parts lying on opposite sides of said disk, bolts connecting said parts, bell crank levers mounted on the heads of said bolts for drawing them, and loose rings surrounding the heads of said bolts and forming bearings for the levers, the looseness of said rings allowing them to turn to present a fresh face to the levers.

5. In a friction clutch, the combination of a clutch member having a radially extending disk, a second clutch member having a disk portion extending beyond the disk first mentioned and provided with an overhanging flange, a clamping ring seating within such flange on the other side of said first-mentioned disk, bolts passing through said ring and through the disk portion of the second member beyond the periphery of said first-mentioned disk, said bolts having bifurcated heads, and bell crank levers pivoted in such bifurcations and having short arms adapted to bear against the clutch member carrying the bolts.

6. In a friction clutch, a drive shaft, a driving clutch member secured to said shaft, said member having a sleeve surrounding the shaft and also having a disk extension, a driven clutch member journaled upon the sleeve of the driving clutch member, said driven clutch member being formed of two parts that are arranged on opposite sides of the disk extension, bolts connecting the said two parts of the driven clutch member, means for exerting a pull on said bolts, whereby the parts of the driven member will be drawn into driving engagement with said disk extension, the part of the driving clutch member which is on the opposite side from the sleeve having a circular ledge, within which a central space is provided into which may extend the hub of a wheel on the driving shaft.

7. The combination of a pair of clutch members, each having a disk portion and one of said members having a hub portion extending in one direction therefrom, a pulley having a hub mounted on the first hub portion and connected to the disk portion of the other clutch member, lever mechanism for operating the clutch, a plate secured to the end of one of said hub members, a stub shaft projecting from said plate away from the clutch members, a collar slidable on said shaft for operating said levers, and means for moving said collar.

8. In a friction clutch, the combination of a member having a sleeve and a disk extension, a second member having a disk, a pulley having a hub mounted on said sleeve, and connected to the disk of the second member, a plate extending across the ends of said sleeve and hub, an axial stud carried by said plate, a shiftable collar on said stud, mechanism for clamping the two disk extensions, and operating mechanism therefor connected with said collar.

9. In a friction clutch, in combination, a clutch member having a sleeve and a disk extension, a second clutch member journaled upon the sleeve of the first-mentioned clutch member, said second member having a disk extension adapted to engage one face of the first member and having a flange extending across the periphery of the first member, a friction ring fitting within said flange, bolts passing through said ring and the disk extension of the second clutch member, nuts on said bolts where they project beyond said ring, and bell crank levers connected with the other ends of the bolts for operating the clutch.

10. In a friction clutch, in combination, a clutch member having a sleeve and a disk extension, a ledge on one face of said disk extension, a second clutch member journaled upon the sleeve of the first-mentioned clutch member, said second member having a disk extension adapted to engage one face of the first member, and having a flange extending across the periphery of the first member, a friction ring surrounding said ledge and fitting within said flange, bolts passing through said ring and the disk extension of the second clutch member, nuts on said bolts where they project beyond said ring, a pulley surrounding the sleeve of the clutch member, a shiftable collar beyond the said sleeve, toggle links connected with said collar, and bell crank levers connected with said toggle links and extending into the interior of the pulley and pivoted to the heads of said bolts.

11. In a friction clutch, the combination of a shaft, a clutch member rigid therewith, a second clutch member, a pulley, and means for connecting said pulley with said second clutch member, said means comprising screws connecting the second clutch member with the hub pulley and one or more projections from the second clutch member adapted to be engaged by one or more spokes of the pulley.

12. In a friction clutch, the combination of a clutch member having an extended hub and a disk projecting therefrom, a second clutch member having a sleeve mounted on said hub and a disk portion extending from one end of the sleeve and lying adjacent to the disk mentioned and provided with a flange overhanging the periphery of said disk, a clamping ring seating within such flange on the other side of said first mentioned disk, bolts passing through said ring and through the disk portion of said second clutch member beyond the periphery of said first mentioned disk, and mechanism for drawing on said bolts to frictionally clamp said disk between the ring and said disk portion.

In testimony whereof, we hereunto affix our signatures in the presence of two witnesses.

ALBERT SCHWEHR.
GEO. A. SCHWEHR.

Witnesses:
J. B. HULL,
G. A. MYERS.